United States Patent [19]

Arai

[11] Patent Number: 4,889,417

[45] Date of Patent: * Dec. 26, 1989

[54] PROJECTION LENS FOR TELEVISION PROJECTOR

[75] Inventor: Norikazu Arai, Komae, Japan

[73] Assignee: Konishiroku Photo Industry Co., Ltd., Tokyo, Japan

[ * ] Notice: The portion of the term of this patent subsequent to May 19, 2004 has been disclaimed.

[21] Appl. No.: 833,342

[22] Filed: Feb. 25, 1986

[30] Foreign Application Priority Data

Mar. 1, 1985 [JP] Japan ................................. 60-38697

[51] Int. Cl.⁴ .......................... G02B 13/18; G02B 1/06
[52] U.S. Cl. ................................... 350/432; 350/412; 350/418
[58] Field of Search ....................... 350/432, 412, 418; 358/237, 242, 64, 231

[56] References Cited

U.S. PATENT DOCUMENTS

| | | | |
|---|---|---|---|
| 4,348,081 | 9/1982 | Betensky | 350/432 X |
| 4,564,269 | 1/1986 | Uehara | 350/432 X |
| 4,576,442 | 5/1986 | Oguino | 350/412 X |
| 4,666,261 | 5/1987 | Arai | 350/432 |
| 4,682,862 | 7/1987 | Moskovich | 350/432 |
| 4,697,892 | 10/1987 | Betensky | 350/432 |
| 4,704,009 | 11/1987 | Yamamoto et al. | 350/432 |

Primary Examiner—Bruce Y. Arnold
Assistant Examiner—Ronald M. Kachmarik
Attorney, Agent, or Firm—Jordan B. Bierman

[57] ABSTRACT

A projection lens for a three-tube television projector of the type in which three CRT's of blue, green and red are projected on the screen. The projection lens comprises a plastic first lens having an extremely small refracting power, a glass second lens, a plastic third lens and a plastic fourth lens disposed immediately before a face plate of CRT. There are large spaces between the first lens and the second lens and between the third lens and the fourth lens so that reflecting mirrors may respectively be arranged therebetween. For reducing the cost, the fourth lens can be formed from a liquid lens filled with a liquid between a thin-wall shell and a face plate.

5 Claims, 8 Drawing Sheets

MERIDIONAL · COMA

MERIDIONAL · COMA

MERIDIONAL · COMA

MERIDIONAL · COMA

SPHERICAL ABERRATION  ASTIGMATISM  DISTORTION

MERIDIONAL · COMA

PROJECTION LENS FOR TELEVISION PROJECTOR

BACKGROUND OF THE INVENTION

1. Field of the Invention

This invention relates to a projection lens used for a three-tube television projector, and more particularly, to a projection lens which comprises a plastic lens but is not affected by variation in temperature.

2. Description of the Prior Art

In a three-tube television projector, image planes of CRTs of B (blue), G (green) and R (red) are superimposed and projected on a screen by three lenses to obtain a color image. Therefore, the projection lens used for that purpose need not be an achromatic lens but has the requirements that a large aperture having F number of from about 1.0 to 1.3 is provided and that the lens is low in cost.

Such a lens system formed from a plastic lens has been known from Japanese Patent Application Laid-Open Nos. 124,114/80, 34,515/82, 108,818/82, and the like, the lens system having a simple structure of three groups and three lenses.

The television projector has to provide a large screen whereas the entire apparatus has to be miniaturized for popularization. It is desired that a reflecting mirror is arranged in an optical system, and an optical path is bended. However, the aforesaid lens system has no space into which such a reflecting mirror may be inserted.

A projection lens is available in which though it is composed of four lenses, a plane reflecting mirror is inserted between a lens on the screen side and an intermediate lens for use with a large aperture and a wide field angle. (For example, Japanese Patent Application Laid-Open No. 198,017/83)

However, the aforesaid projection lens composed of plastic lenses is greatly varied in refractive index of plastic by temperature, and therefore, when the back-focus varies to vary the temperature within the television projector apparatus, a focal point is not formed on the screen to deteriorate a projected image. This makes it necessary to have apparatus which can minimize a variation in temperature of the projection lens, resulting in an increase in cost.

The change in the back-focus due to the temperature of the projection lens may be minimized by forming the second lens into a glass lens, for example, as disclosed in Japanese Patent Application Nos. 118,616/83 and 125,007/83. However, for accomplishment of sufficient correction of aberration, where an inexpensive material is used for a second lens whose refractive index is about 1.5, an aspherical lens has to be used, and where a spherical lens is used, a material having a high refractive index has to be used. In either case, high costs involve.

Japanese Patent Application Laid-Open No. 155,818/83 discloses one which partly comprises a glass lens. In this disclosure, a second lens is divided into one comprising glass and the other comprising plastic, in which case the plastic lens greatly serves relative to the entire refracting power, and with respect to the variation in temperature, it will be unsatisfactory in the event the focal length of the projection lens exceeds 150 mm.

None of these known patents disclose that two reflecting mirrors may be inserted and arranged in the lens system. There is Japanese Patent Application No. 174,297/83 filed by the present applicant in which two reflecting mirrors may be inserted. This application has the construction as shown in FIG. 8, which is however not only insufficient in correction relative to the variation in temperature but the distribution of the refracting power to the second lens is great, because of which an introvert comatic aberration remains in a portion where a field angle is large as shown in FIG. 9, and a quality of image in a peripheral edge portion of the image plane is not always satisfactory.

SUMMARY OF THE INVENTION

It is an object of this invention to provide a lens for a projector which has air spaces capable of receiving therein a plurality of reflecting mirrors despite a large aperture and a wide field angle, and which can minimize a variation in back-focus resulting from a variation in temperature while being composed of plastic lenses to decrease a deterioration of an image and enhance a quality of image in a peripheral edge of an image plane.

According to this invention, a projection lens for a television projector comprises four units comprising, arranged from a screen side, a first lens $L_1$ having a small refracting power, a positive lens $L_2$ and a third lens $L_3$ arranged through a large air space from the first lens $L_1$, and a fourth lens $G_4$ arranged through a large air space from the second and third lenses $L_2$ and $L_3$, the lens $L_1$ comprising a plastic lens at least one surface of which is aspherical, the lens $L_2$ comprising a glass lens, the lens $L_3$ comprising a plastic lens at least one surface of which is aspherical, the lens $G_4$ of which lens on the side closest to the screen is a plastic lens with a concave surface thereof oriented toward the screen. This projection lens is satisfied with the following conditions:

$$-0.15 < f/f_1 < 0.1 \quad (1)$$

$$0.55 < f/f_2 < 0.85 \quad (2)$$

$$0.1 < \left(\frac{1}{r_5} - \frac{1}{r_4}\right)f < 1.3 \quad (3)$$

where

| | |
|---|---|
| $f$ | combined focal length of the entire system |
| $f_1$ | focal length of $L_1$ |
| $f_2$ | focal length of $L_2$ |
| $r_4$ | radius of curvature of the surface opposite the screen of $L_2$ |
| $r_5$ | radius of curvature of the apex of the surface on the screen side of $L_3$ |

When the value exceeds the upper limit of the condition (1) and the refracting power of $L_1$ increases, it is advantageous in correction of various aberrations while in order to lengthen the back-focus, the lens spacing between $L_3$ and $G_4$ has to be shortened, making it impossible to insert a reflecting mirror. Instead, if the lens spacing between $L_2$ and $L_3$ is increased to insert the reflecting mirror therein, a large aperture and a large field angle may not be obtained, making it impossible to serve as a projection lens for a television projector. Conversely, when the value exceeds the lower limit of the condition (1) and a negative refracting power increases, apertures of $L_2$ and $L_3$ become excessively large, making it impossible to produce a projection lens at a low cost.

The condition (2) is provided to restrain the variation in back-focus resulting from a variation in temperature to an extent which does not give rise to a problem in practical use. If the lens is constructed which is capable of inserting a plurality of reflecting mirrors, a limitation in a ratio of large aperture occurs. Thus, for increasing a luminance of an image on the screen, a projection enlarging magnification has to be made small. For obtaining a large image plane as required by the television projector, the size of an image plane of CRT has to be increased. On the other hand, for sufficiently obtaining a marginal quantity of light, the focal length has to be increased to above 150 mm whereas the longer the focal length, the greater variation in back-focus to the variation in temperature results. Under these restrictions, a problem of distribution of refracting power of $L_2$ and $L_3$ poses. When the value exceeds the upper limit of the condition (2) and the focal length decreases, the variation in back-focus resulting from the variation in temperature rarely occurs but the introvert comatic aberration increases in a portion where the field angle is large, which is difficult to be corrected even if the refracting surface of $L_3$ is made to be aspherical to deteriorate the quality of an image in a peripheral edge of an image plane. Conversely, when the value exceeds the lower limit of the condition (2) and the focal length of $L_2$ increases, the refracting power distributed to $L_3$ which is a plastic lens increases, and the variation in back-focus resulting from the variation in temperature increases The condition (3) is provided to correct the comatic aberration. The comatic aberration in a portion where the filed angle is large, for which a problem has been heretofore encountered, may be well corrected by suitably selecting the shape of an air lens between $L_2$ and $L_3$. When the value exceeds the upper limit of the condition (3), the comatic aberration in a portion where the field angle is large is over. Conversely, when the value exceeds the lower limit of the condition (3), the comatic aberration in a portion where the field angle is large is under. In either case, the performance of the peripheral edge of the image plane is deteriorated.

Furthermore, for obtaining a better image plane as a whole, it is necessary to make at least one surface of respective $L_1$ and $L_3$ aspherical. Particularly, in $L_3$, let F be the F number of lens, and $\Delta_3$ be the amount of displacement between an aspherical surface in the outermost margin of an effective diameter of an aspherical refracting surface of $L_3$ and a reference spherical surface having a radius of curvature of the apex. If a positive is given when the aspherical surface is displaced toward the screen as being away from an optical axis in respect of the surface on the screen side, and if a positive is given when the aspherical surface is displaced on the side opposite the screen in respect of the surface on the side opposite the screen, then it is desired to be satisfied with $$0.01 < \frac{\Delta_3 F_4}{f} < 0.05 \quad (4)$$

Where both surfaces of $L_3$ are aspherical, $\Delta_3$ is the amount to which is added the amount of displacement of aspherical surfaces of both surfaces.

When the value exceeds the aforesaid upper limit, the extrovert comatic aberration increases or surplus correction of spherical aberration occurs. Conversely, when the value exceeds the lower limit, the introvert coma increases or short correction of spherical aberration occurs. In either case, the quality of image is deteriorated.

DETAILED DESCRIPTION OF THE PREFERRED EMBODIMENTS

Figure 1:
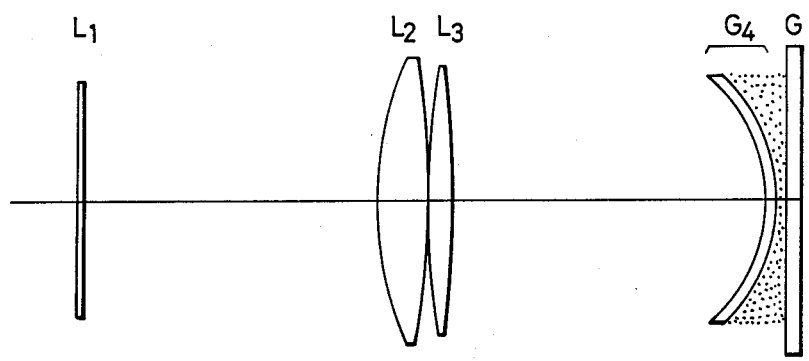
FIG. 1 is a sectional view showing Embodiments 1 and 2 of a projection lens according to the present invention.

In the following, embodiments of the projection lens according to the present invention are shown. In Tables, reference character $r_i$ designates the radius of curvature of the apex of the $i^{th}$ lens from the screen side; $d_i$, the the spacing of the $i^{th}$ lens from the screen side; $n_i$, the refractive index of a material of the $i^{th}$ lens from the screen side; and $\nu_i$, the Abbe's number, and $D_3$, the largest diameter of $L_3$. The aspherical shape is represented by the following equation, where in a cross coordinate system with the apex of the surface as an original point and with the optical axis as the axis X, C represents the curvature of the apex; K, the conical constant; A1, A2, A3 and A4, the aspherical coefficient; P1, P2, P3 and P4, the power number of the aspherical surface:

$$X = \frac{C\phi^2}{1 + \sqrt{1 - (1 + K)C^2\phi^2}} + \sum_{i=1}^{4} A_i \phi^{pi}$$

$$\phi = \sqrt{y^2 + z^2}$$

In Tables, values of the face plate G are also indicated.

Embodiments 1 and 2 are examples in which as shown FIG. 1, the fourth group $G_4$ comprises a plastic lens with a concave surface oriented toward the screen, and a liquid having the refractive index of about 1.4 is filled between the $G_4$ and the face plate G. By forming the plastic lens constituting the fourth group $G_4$ into a liquid lens having a shell having a thin-wall and equal thickness as described above, this plastic lens may be considerably reduced in cost.

Figure 2:
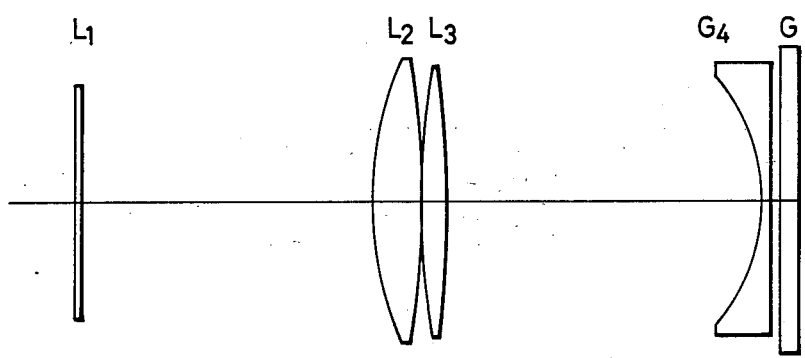
FIG. 2 is a sectional view of Embodiments 3, 4 and 5.
Figure 3:
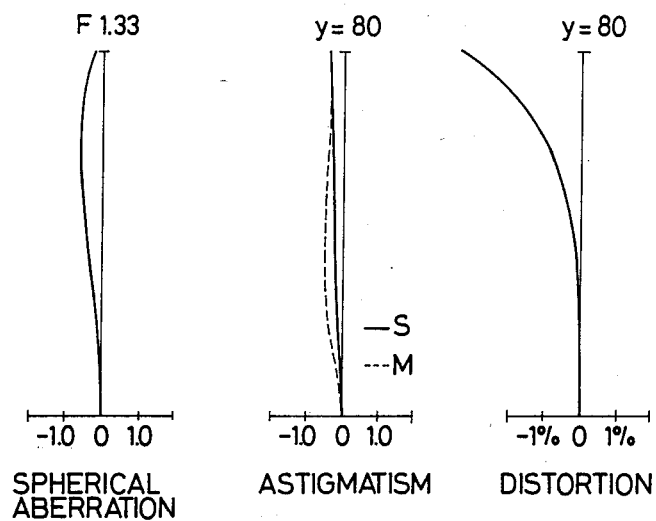
FIGS. 3 to 7 show aberrations therefor.
Figure 3:
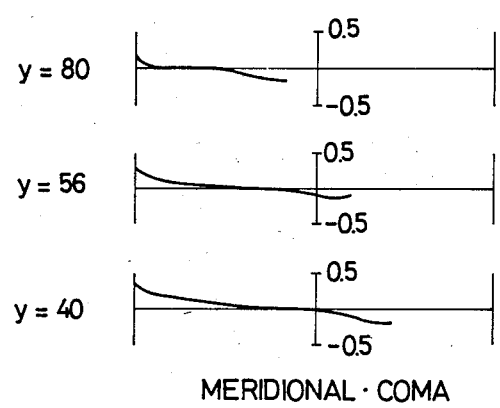
Figure 4:
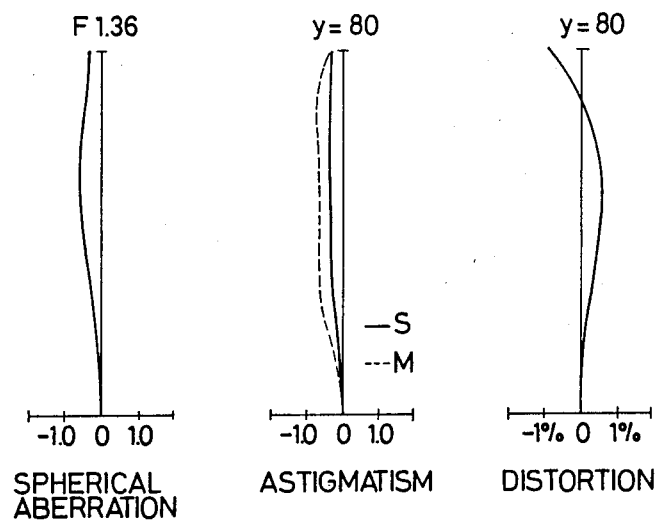
Figure 4:
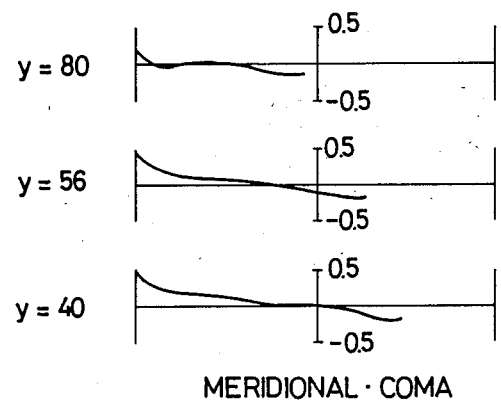
Figure 5:
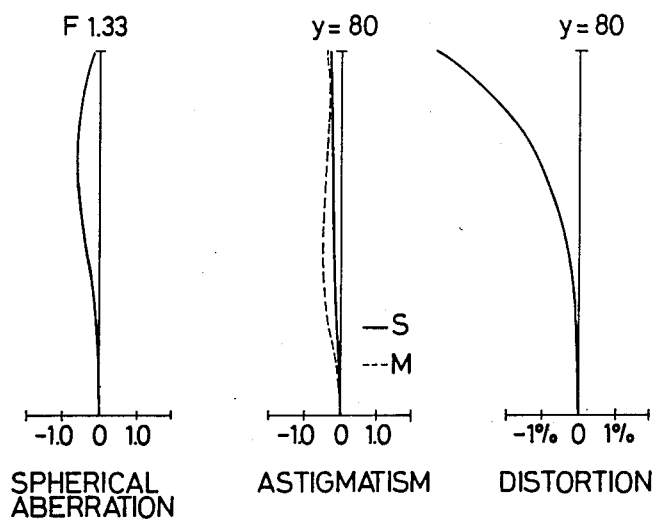
Figure 5:
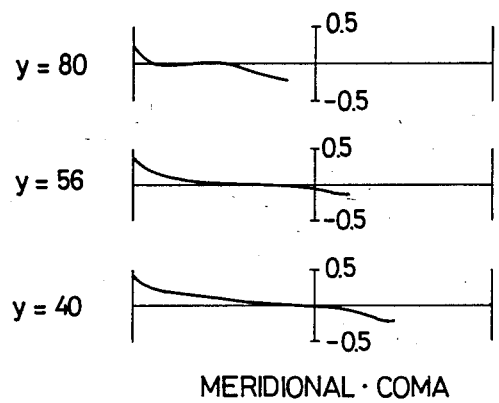
Figure 6:
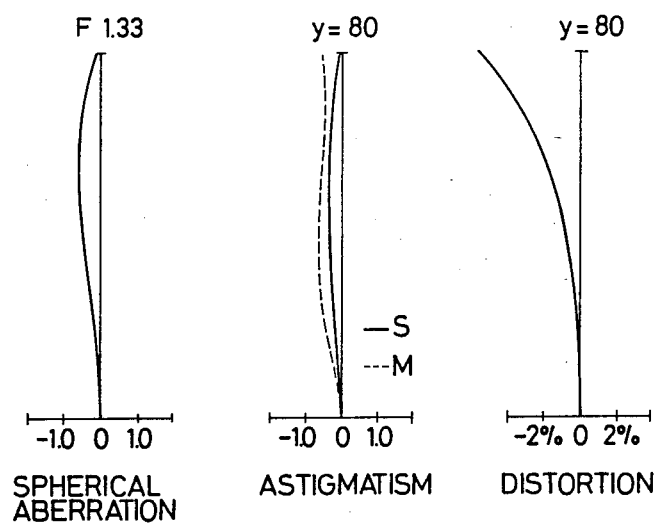
Figure 6:
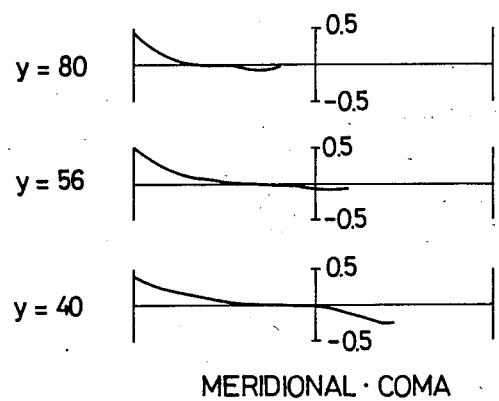
Figure 7:
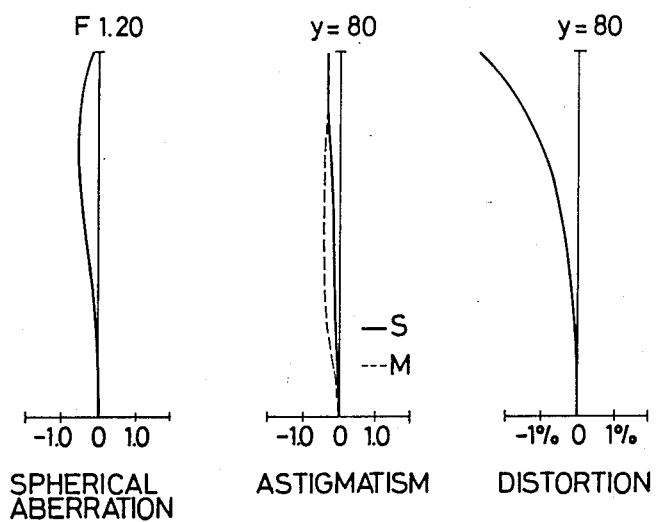
Figure 7:
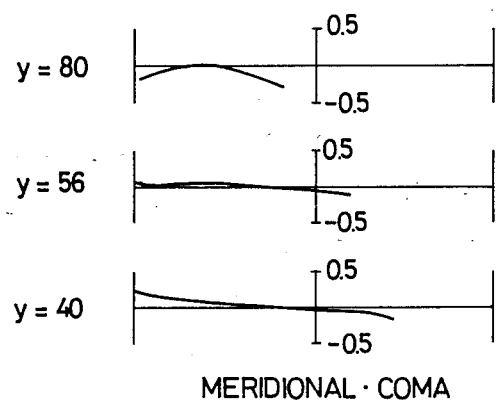
Figure 8:
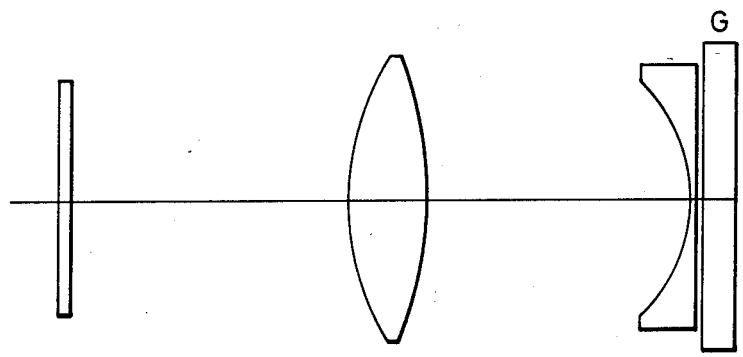
FIG. 8 is a sectional view showing a conventional construction of the lens.
Figure 9:
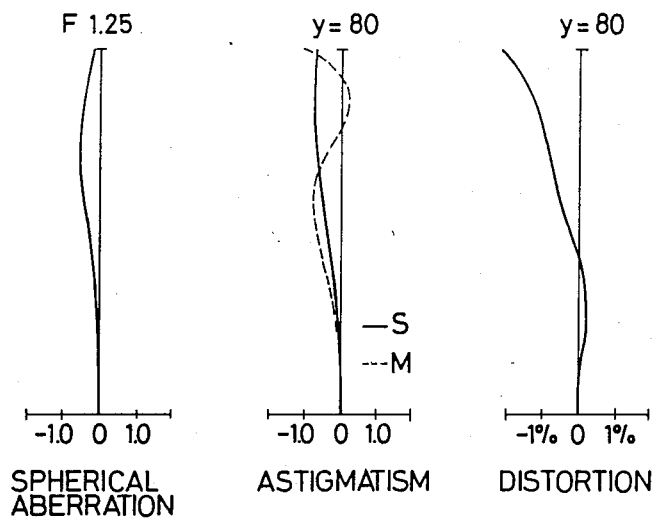
FIG. 9 shows an aberration curve therefor.
Figure 9:
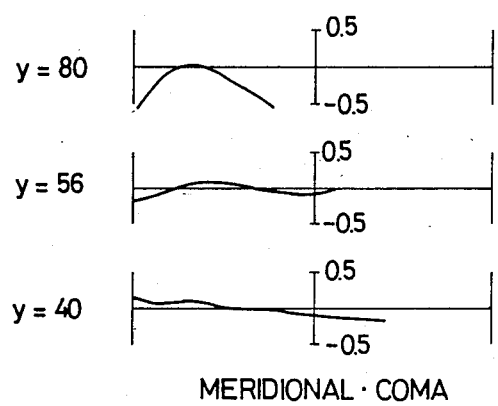

Embodiments 3 to 5 show the fourth group $G_4$ formed from a negative plastic lens with a concave surface oriented toward the screen as shown in FIG. 2.

EMBODIMENT 1 f = 171.43 Aperture ratio 1:1.33 Magnification −0.143

$$f/f_1 = 0 \quad \left(\frac{1}{r_5} - \frac{1}{r_4}\right)f = 0.793$$

| | | $r_i$ | $d_i$ | $n_i$ | $\nu_i$ |
|---|---|---|---|---|---|
| 1 | $L_1$ | ∞ | 4.00 | 1.49305 | 55.0 |
| 2 | | ∞ | 162.00 | | |
| 3 | $L_2$ | 185.900 | 30.00 | 1.51841 | 64.1 |
| 4 | | −370.358 | 0.50 | | |
| 5 | $L_3$ | 520.00 | 10.50 | 1.49305 | 55.0 |

-continued

| | | | | | |
|---|---|---|---|---|---|
| 6 | | −908.150 | 177.00 | | |
| 7 | $G_4$ | −77.720 | 4.00 | 1.58710 | 30.0 |
| 8 | | −91.500 | 5.83 | 1.40580 | |
| 9 | G | ∞ | 10.00 | 1.54000 | |
| 10 | | ∞ | | | |

Aspherical coefficient · power number

Second surface
K = 0.0
A1 = 3.09340D−08  P1 = 4.0000
A2 = 5.92780D−12  P2 = 6.0000
A3 = −7.06010D−16 P3 = 8.0000
A4 = 2.12780D−20  P4 = 10.0000
Sixth surface
K = 8.80470D+01
A1 = 5.96160D−08  P1 = 4.0000
A2 = −1.07840D−12 P2 = 6.0000
A3 = 3.94770D−16  P3 = 8.0000
A4 = 1.57600D−21  P4 = 10.0000
Seventh surface
K = −7.11570D−01
A1 = −3.42350D−08 P1 = 4.0000
A2 = −3.01370D−12 P2 = 6.0000
A3 = 3.75080D−16  P3 = 8.0000
A4 = 3.62910D−21  P4 = 10.0000

$$\Delta_3 = 1.19 \quad D_3 = 144.6 \quad \frac{\Delta_3 \cdot F_4}{f} = 0.0217$$

EMBODIMENT 2 f = 175.12 Aperture ratio 1:1.36 Magnification −0.145

$$f/f_1 = 0 \quad \left(\frac{1}{r_5} - \frac{1}{r_4}\right)f = 0.677$$

| | | $r_i$ | $d_i$ | $n_i$ | $v_i$ |
|---|---|---|---|---|---|
| 1 | $L_1$ | ∞ | 4.00 | 1.49305 | 55.0 |
| 2 | | ∞ | 153.00 | | |
| 3 | $L_2$ | 169.696 | 32.00 | 1.51841 | 64.1 |
| 4 | | −319.839 | 0.50 | | |
| 5 | $L_3$ | 1357.277 | 8.00 | 1.49305 | 55.0 |
| 6 | | −785.255 | 175.00 | | |
| 7 | $G_4$ | −84.141 | 4.00 | 1.58710 | 30.0 |
| 8 | | −91.500 | 10.21 | 1.40580 | |
| 9 | G | ∞ | 10.00 | 1.54000 | |
| 10 | | ∞ | | | |

Aspherical coefficient · power number

Second surface
K = 0.0
A1 = 3.38300D−08  P1 = 4.0000
A2 = 5.03442D−12  P2 = 6.0000
A3 = −4.22330D−16 P3 = 8.0000
A4 = −8.86129D−21 P4 = 10.0000
Sixth surface
K = 2.17388D+01
A1 = 6.13605D−08  P1 = 4.0000
A2 = −4.65162D−13 P2 = 6.0000
A3 = 2.59334D−16  P3 = 8.0000
A4 = −1.85397D−21 P4 = 10.0000
Seventh surface
K = −6.56108D−04
A1 = −1.77930D−07 P1 = 4.0000
A2 = 4.72538D−11  P2 = 6.0000
A3 = 2.80098D−16  P3 = 8.0000
A4 = −1.73093D−22 P4 = 10.0000

-continued $$\Delta_3 = 1.56 \quad D_3 = 143.2 \quad \frac{\Delta_3 \cdot F_4}{f} = 0.0304$$

EMBODIMENT 3 f = 171.40 Aperture ratio 1:1.33 Magnification −0.143

$$f/f_1 = 0 \quad \left(\frac{1}{r_5} - \frac{1}{r_4}\right)f = 0.779$$

| | | $r_i$ | $d_i$ | $n_i$ | $v_i$ |
|---|---|---|---|---|---|
| 1 | $L_1$ | ∞ | 4.00 | 1.49305 | 55.0 |
| 2 | | ∞ | 162.00 | | |
| 3 | $L_2$ | 215.561 | 27.00 | 1.51841 | 64.1 |
| 4 | | −452.921 | 0.50 | | |
| 5 | $L_3$ | 427.707 | 14.00 | 1.49305 | 55.0 |
| 6 | | −503.891 | 177.00 | | |
| 7 | $G_4$ | −87.458 | 4.00 | 1.49305 | 58.3 |
| 8 | | ∞ | 4.99 | | |
| 9 | G | ∞ | 10.00 | 1.54000 | |
| 10 | | ∞ | | | |

Aspherical coefficient · power number

Second surface
K = 00
A1 = 3.52063D−08  P1 = 4.0000
A2 = 6.10409D−12  P2 = 6.0000
A3 = −7.23907D−16 P3 = 8.0000
A4 = 2.29701D−20  P4 = 10.0000
Sixth surface
K = 2.43864D+01
A1 = 5.87217D−08  P1 = 4.0000
A2 = −9.53659D−13 P2 = 6.0000
A3 = 3.85776D−16  P3 = 8.0000
A4 = 1.60642D−21  P4 = 10.0000
Seventh surface
K = −1.01116D+00
A1 = −1.15013D−07 P1 = 4.0000
A2 = 7.30633D−12  P2 = 6.0000
A3 = 4.74749D−16  P3 = 8.0000
A4 = 4.30875D−21  P4 = 10.0000

$$\Delta_3 = 0.92 \quad D_3 = 147.6 \quad \frac{\Delta_3 F_4}{f} = 0.0167$$

EMBODIMENT 4 f = 160.00 Aperture ratio 1:1.33 Magnification −0.143

$$f/f_1 = -0.099 \quad \left(\frac{1}{r_5} - \frac{1}{r_4}\right)f = 0.959$$

| | | $r_i$ | $d_i$ | $n_i$ | $v_i$ |
|---|---|---|---|---|---|
| 1 | $L_1$ | ∞ | 4.00 | 1.49305 | 55.0 |
| 2 | | 800.000 | 154.00 | | |
| 3 | $L_2$ | 194.117 | 31.00 | 1.51841 | 64.1 |
| 4 | | −309.555 | 0.50 | | |
| 5 | $L_3$ | 361.568 | 15.00 | 1.49305 | 55.0 |
| 6 | | −874.814 | 170.00 | | |
| 7 | $G_4$ | −90.658 | 4.00 | 1.49305 | 58.3 |
| 8 | | ∞ | 7.70 | | |
| 9 | | ∞ | 10.00 | 1.54000 | |

-continued

| | | |
|---|---|---|
| 10 | G | ∞ |

Aspherical coefficient · power number

Second surface
K = 0.0
A1 = 5.48170D−08      P1 = 4.0000
A2 = 7.36537D−12       P2 = 6.0000
A3 = −7.59099D−16     P3 = 8.0000
A4 = 2.25790D−20       P4 = 10.0000
Sixth surface
K = 6.83274D+01
A1 = 6.06811D−08       P1 = 4.0000
A2 = −4.44908D−13     P2 = 6.0000
A3 = 2.92297D−16       P3 = 8.0000
A4 = 1.91941D−22       P4 = 10.0000
Seventh surface
K = −7.23960D−01
A1 = −1.50134D−07     P1 = 4.0000
A2 = 7.96835D−12       P2 = 6.0000
A3 = 4.82446D−16       P3 = 8.0000
A4 = 4.36936D−21       P4 = 10.0000

$$\Delta_3 = 1.49 \quad D_3 = 148.2 \quad \frac{\Delta_3 \cdot F_4}{f} = 0.0292$$

EMBODIMENT 5 f = 160.00  Aperture ratio 1:1.20  Magnification −0.143

$$f/f_1 = 0.093 \quad \left(\frac{1}{r_5} - \frac{1}{r_4}\right)f = 0.291$$

| | | $r_i$ | $d_i$ | $n_i$ | $v_i$ |
|---|---|---|---|---|---|
| 1 | L₁ | 850.000 | 7.00 | 1.49305 | 55.0 |
| 2 | | ∞ | 134.00 | | |
| 3 | L₂ | 164.343 | 26.00 | 1.51841 | 64.1 |
| 4 | | −498.520 | 0.50 | | |
| 5 | L₃ | −5430.159 | 11.00 | 1.49305 | 55.0 |
| 6 | | −249.618 | 147.00 | | |
| 7 | G₄ | −69.740 | 4.00 | 1.49305 | 58.3 |
| 8 | | ∞ | 6.44 | | |
| 9 | G | ∞ | 10.00 | 1.54000 | |
| 10 | | ∞ | | | |

Aspherical coefficient · power number

Second surface
K = 1.79019D+01
A1 = −5.76770D−08     P1 = 4.0000
A2   −2.51960D−12       P2 = 6.0000
A3 = −1.38072D−16     P3 = 8.0000
A4 = 2.38682D−20       P4 = 10.0000
Fifth surface
K = −3.85136D+00
A1 = −6.36521D−08     P1 = 4.0000
A2 = −1.14203D−12     P2 = 6.0000
A3 = 1.17986D−17       P3 = 8.0000
Seventh surface
K = −2.78436D+00
A1 = −5.09941D−07     P1 = 4.0000
A2 = 2.21985D−11       P2 = 6.0000
A3 = 2.39010D−16       P3 = 8.0000
A4 = 7.60977D−22       P4 = 10.0000

$$\Delta_3 = 2.06 \quad D_3 = 147.6 \quad \frac{\Delta_3 \cdot F_4}{f} = 0.0268$$

In the projection lens shown in the first embodiment of the previously cited Japanese Patent Application No. 174,297/83, the change $\Delta f_B$ of the back-focus when the temperature is changed through 10° C. is extremely grat, i.e., 0.5, whereas in the present invention, the $\Delta f_B$ in the embodiments is in the range of from 0.08 to 0.22 as shown in the following Table, which poses no problem in practical use.

TABLE 1

| | $\Delta f_B$ |
|---|---|
| Embodiment 1 | 0.14 |
| Embodiment 2 | 0.08 |
| Embodiment 3 | 0.22 |
| Embodiment 4 | 0.14 |
| Embodiment 5 | 0.19 |

Furthermore, as shown in FIGS. 3 to 7, the comatic aberration in the margin of the image plane is well corrected, and the astigmatism is also well corrected. In addition, the curvature of the image surface is small, and excellent quality of image may be obtained in the entire image plane.

What is claimed is:

1. A projection lens for a television projector comprising four units which comprise, arranged from a screen side, a first lens $L_1$ having a small refracting power, a positive lens $L_2$ and a third lens $L_3$ arranged through a large air space from the first lens $L_1$, and a fourth lens $G_4$ arranged through a large air space from the second and third lenses $L_2$ and $L_3$, the lens $L_1$ comprising a plastic lens at least one surface of which is aspherical, the lens $L_2$ comprising a glass lens, the lens $L_3$ comprising a plastic lens at least one surface of which is aspherical, the lens $G_4$ of which lens on the side closest to the screen is a plastic lens with a concave surface thereof oriented toward the screen, characterized by being satisfied with the following condition:

$$-0.15 < f/f_1 < 0.1$$

where

| f: | combined focal length of the entire system |
|---|---|
| $f_1$: | focal length of $L_1$ |

2. The projection lens according to claim 1, wherein said lens is satisfied with the following condition:

$$0.55 < f/f_2 < 0.85$$

where $f_2$: focal length of $L_2$

3. The projection lens according to claim 1, wherein said lens is satisfied with the following condition:

$$0.1 < \left(\frac{1}{r_5} - \frac{1}{r_4}\right)f < 1.3$$

where

| $r_4$ | radius of curvature of the surface opposite the screen of $L_2$ |
|---|---|
| $r_5$ | radius of curvature of the apex of the surface on the screen side of $L_3$ |

4. The projection lens according to claim 3, wherein said lens is satisfied with the following condition:

$$0.01 < \frac{\Delta_3 F_4}{f} < 0.05$$

where
$\Delta_3$: Amount of displacement in a direction of an optical direction of an aspherical surface in the outermost margin of the effective diameter of an aspherical refracting surface of $L_3$ and a reference spherical surface having a radius of curvature of the apex
F: F number of the lens.

5. The projection lens according to claim 1, wherein the fourth unit $G_4$ comprises a substantially equal-thickness thin-wall plastic lens and a liquid.

* * * * *